June 14, 1932. D. B. KNIGHT Re. 18,494

REFRIGERATION

Original Filed May 24, 1928 2 Sheets-Sheet 1

Inventor
Donald B. Knight
By his Attorneys
Redding, Greeley, O'Shea & Campbell

June 14, 1932. D. B. KNIGHT Re. 18,494

REFRIGERATION

Original Filed May 24, 1928 2 Sheets-Sheet 2

Inventor
Donald B. Knight
By his Attorneys
Redding, Greeley, Shea & Campbell

Reissued June 14, 1932 Re. 18,494

UNITED STATES PATENT OFFICE

DONALD B. KNIGHT, OF BROOKLYN, NEW YORK

REFRIGERATION

Original No. 1,748,957, dated March 4, 1930, Serial No. 280,139, filed May 24, 1928. Application for reissue filed April 16, 1931. Serial No. 530,700.

This invention relates to the system of refrigeration described in Letters Patent of the United States No. 1,609,334, dated December 7, 1926. In that system, as disclosed in said Letters Patent, the development of internal pressure is a necessary incident. This requires the apparatus to be so constructed as to be capable of resisting such pressure, with consequent expense. It also subjects the apparatus to restrictions imposed by local communities and to regulations of the Interstate Commerce Commission governing the use and shipment of compressed gases. It creates sales resistance due to fancied or real dangers attending the use of gases under compression. It requires careful tests to insure reasonable safety. It involves service cost due to leakage. It requires expenditure of time and labor in charging the apparatus and in purging it. It is the object of the present invention to enable refrigeration by methods of the general character of that described in said Letters Patent to be carried on at atmospheric pressure, without the development of internal pressure of material degree in any part of the apparatus and without subjection to such objections as have been described above.

It is a further object to carry on this method of refrigeration so that two refrigerating temperatures are obtained; a low temperature which is available, if so desired, for the purpose of freezing ice, and a higher temperature which is available for the preservation of foods.

By the use of these two temperatures, obtained by the process herein described, frost need not collect upon the outer walls of the evaporator and the necessity of shutting down the machine at intervals in order to defrost the evaporator may be eliminated. Furthermore, foods may be preserved in a fresher condition inasmuch as the moisture is not distilled from them by excessively low evaporator temperatures. A greater efficiency is also obtained in the operation of the system as will be later explained and, as will also be later explained, the evaporation at two temperatures provides a method whereby refrigeration of this general character may be carried on successfully at atmospheric pressure.

In accordance with the invention the cooling agent employed is of relatively low vapor pressure and is evaporated in the presence of an inert auxiliary agent at atmospheric pressure, the circulation of the auxiliary agent being accomplished also under substantially atmospheric pressure, by difference in specific weights of vertically extending bodies of fluid in the system. It will be seen that the invention is characterized by the employment of a cooling agent of relatively low vapor pressure, such, for example, as ether an absorbent such, for example, as a solution of ether in phenol or kerosene, and an auxiliary agent, such, for example, as nitrogen or atmospheric air, into which and in the presence of which the ether diffuses and evaporates, all under atmospheric pressure.

In the practice of the invention the following conditions should be established. The refrigerating fluid should be condensible at atmospheric pressure at a temperature, such as normal room temperature, easily reached with the available cooling water or other condensing means. The auxiliary agent should be lighter per unit volume than the vapor of the refrigerating fluid and chemically inert to it. The absorption medium should be such that at atmospheric pressure it will absorb the vapor of the refrigerating fluid even though it is greatly diluted by the auxiliary fluid, it being apparent that if the auxiliary agent has a great effect upon the ability of the refrigerating fluid to evaporate in the evaporator, it will have the same tendency in the absorber. The auxiliary agent should circulate in a comparatively large volume in order that a sufficient amount of refrigeration may be obtained at low temperature with a liquid of relatively high boiling point. The refrigerating fluid is also very dilute in the auxiliary agent at low evaporator temperatures and a powerful absorbent fluid is required for its renewal. The process must be carried on in such manner that the refrigerating fluid will be evaporated in sufficient quantity to realize a practical amount of refrigeration.

It will be noted here that it is characteristic of liquids which boil at temperatures slightly above ordinary or normal room temperature, at substantially atmospheric pressure, that as the conditions are reached under which such liquids will evaporate at freezing temperatures, they must be very much expanded or exceedingly dilute in the auxiliary agent. A large quantity of the auxiliary agent must therefore be circulated for a comparatively small amount of refrigeration. The circulation of the relatively heavier refrigerating fluid is dependent primarily upon the evaporation of that fluid and the method of evaporation is therefore of great importance. The design of the evaporator is therefore of importance. Because of the absence of pressure it must be large and offer a large cooling surface to the refrigerating chamber. During the period when a relatively low temperature is required for the formation of ice independently of the cooling of the refrigerating chamber, the refrigerating chamber might become too cold by reason of the large cooling surface to which it is exposed and the present system therefore also involves a method of two-temperature refrigeration in order to prevent such result. The design of the evaporator is of further importance, particularly with a view to the prevention of the formation of a protective blanket of vapor which would tend to prevent the auxiliary agent from performing its function. As will be seen hereinafter, the evaporator shown and described herein has been designed to meet this condition.

The invention will be more fully explained with reference to the accompanying drawings in which it is illustrated and in which.

Figure 1:
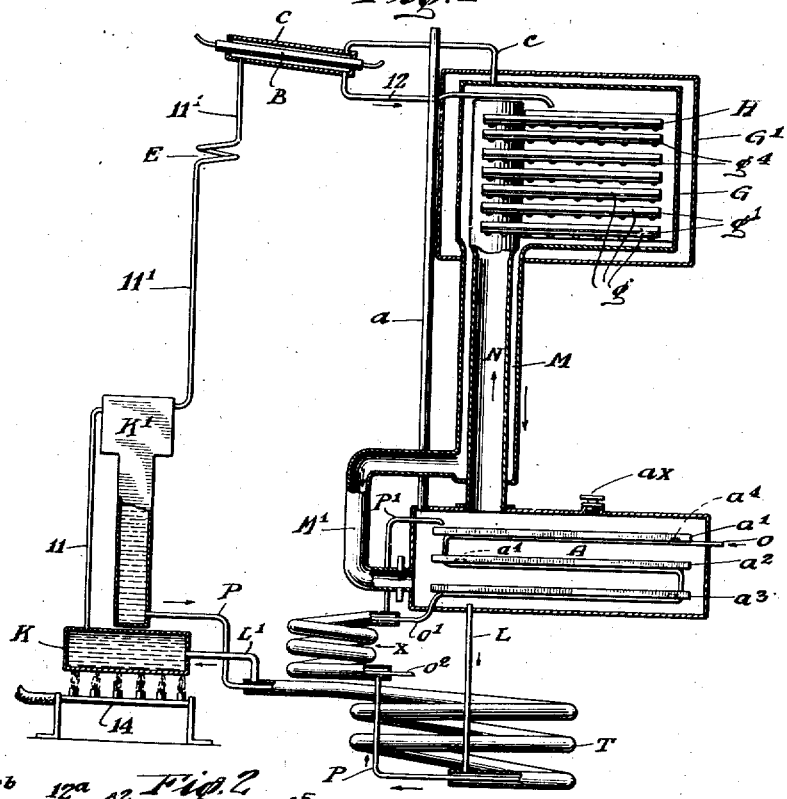
Figure 1 is a somewhat diagrammatic view, in sectional elevation, showing a form of apparatus adapted for the practice of the invention.

The cooling agent, which for purposes of explanation of the nature of the invention and by way of example only, may be taken to be ether, may be introduced into the apparatus, in solution with the absorption liquor, such as phenol or kerosene, through a filling plug conveniently located, as at $a^x$, in an absorber A, and the auxiliary agent, which may also be taken, for purposes of explanation and by way of example only, to be nitrogen or atmospheric air, may be introduced into the apparatus at any convenient point as through the vent pipe $a$ which at its open upper end terminates above the rest of the apparatus. By a suitable source of heat, indicated at 14, the solution of cooling agent and absorption liquor is heated and is caused to rise through a pipe 11 to the upper part of a separator $K^1$ which is independent of the generator K and in which the vapor of the heated cooling agent is separated from the absorption liquor, such as phenol or kerosene, for example, which is in solution with the ether or its functional equivalent. From the separator $K^1$ the vapor of the cooling agent passes upward through the pipe $11^1$ which may include at E a rectifier by which any vapor of the absorption liquor which may have been carried upward with the vapor of the cooling agent is condensed and separated to be returned to the separator $K^1$.

Substantially at the highest point of the apparatus the vapor of the cooling agent enters a condenser C within which is a pipe B suitably connected to a continuous supply of cooling water.

The condensed vapor, which is rich in ether or its equivalent, is conducted from the condenser C through the pipe 12 to the evaporator G which is placed within the refrigerating chamber, indicated at $G^1$. The preferred construction of the evaporator will be described more fully hereinafter. For present purposes it will be sufficient to say that the construction of the evaporator is such that the evaporation of the cooling agent proceeds rapidly in the presence of the auxiliary agent, such as air or nitrogen, with consequent absorption of heat and refrigeration.

By reason of the fact that the density of the vapor of the cooling agent is greater than the density of the auxiliary agent the mixture of the two vapors has a density greater than the density of the auxiliarv agent. Therefore, the mixture of the vapor of the cooling agent and the auxiliary agent passes downward through the pipe M from the evaporator and enters the lower part of the absorber A through the extension $M^1$. The pipe M preferably encloses an inner pipe N through which the relatively lighter auxiliary agent passes upward from the absorber A to the upper part of the evaporator G. This movement of the two gases is due to the fact that the column of vapor in the pipe M is heavier than the column of auxiliary agent in the pipe N. Furthermore, since the difference in the weight of the two gaseous columns, in the pipes M and N, is due to the diffusion of the cooling agent into the auxiliary agent and the subsequent removal of the cooling agent from the auxiliary agent, it follows that when the required amount of refrigeration is small the evaporator temperature will fall, less of the cooling agent will be diffused into the auxiliary agent and the movement of the two gaseous columns will necessarily be slower. Thus the rate of circulation of the auxiliary agent between the evaporator and the absorber is controlled in accordance with the refriger. ting effect required with subsequent economy. The space between the pipe M and the inner pipe N is refrigerated by the cold vapors issuing from the evaporator G, and the warmer and lighter gases passing upward from the absorber A are constantly giving up their heat to the cold vapors in the space between the pipes M and N.

In the illustrated embodiment of the invention the pipes M and N form a heat exchanger by means of which the auxiliary agent is cooled as far as possible by the gases which leave the evaporator in order to avoid refrigeration loss, but it is apparent that the space between the pipes M and N is essentially a refrigerated space whereto refrigeration is delivered and wherein such refrigeration is used up in reducing the temperature of a heat emanating source; a characteristic of this refrigerated space being that the refrigeration is delivered thereto by the circulation through the enclosure of the mixed vapors of the auxiliary agent and the cooling agent issuing from the cold evaporator. It is to be observed that the cooling agent, at the time of its diffusion in the presence of the auxiliary agent, is in itself of relatively low vapor pressure and has no substantial admixture of any absorbent which thereby would prevent the proper operation of the improved process set forth herein.

Within the absorber A the solution of the cooling agent and the absorption liquor takes place, the construction of the absorber, as will be explained more fully hereinafter, being such that the concentration of the solution progresses.

The absorption liquor is delivered to the absorber A from the separator $K^1$ through the pipe P connected to the separator $K^1$ near its lower end, a heat exchanger T, and a precooler X, from which the absorption liquor, poor in cooling agent, is delivered through the pipe $P^1$ to the upper part of the absorber A, passing by gravity to the lower part of the absorber and becoming progressively concentrated.

From the absorber A the concentrated solution passes through a pipe L, the external portion of the heat exchanger T, and the pipe extension $L^1$ back to the generator K where the cycle begins its repetition. The pipe L is preferably extended upward within the absorber for a short distance as represented in the drawings in order that the concentrated liquor may accumulate to a moderate depth in the absorber, the absorption of the cooling agent, in its richest condition, being carried on at the surface of the liquor in the lower part of the absorber.

It being one purpose of the present invention to permit the refrigeration to be carried on at substantially atmospheric pressure, connection from the absorber to the atmosphere is established through the vent pipe *a*, the open upper end of which, as previously stated, terminates above the rest of the apparatus.

To equalize the pressure in the several parts of the apparatus, to prevent the building up of pressure on the generator side, and to permit the escape of air which may be carried over with the vapor from the generator, a direct vapor connection between the vapor space of the condenser C and the evaporator is established through a pipe *c*.

Figure 2:
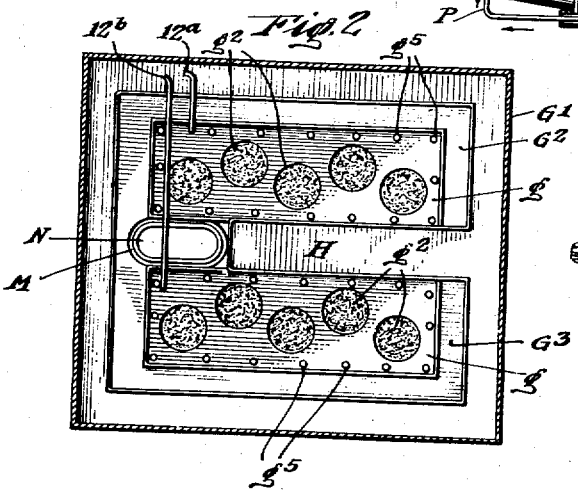
Figure 2 is a detail view showing the construction and arrangement of the evaporator as seen from above, with the top removed.
Figure 3:
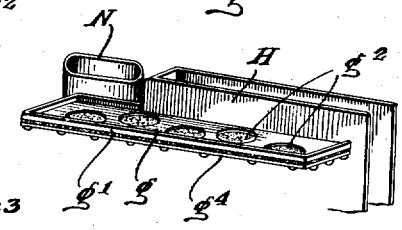
Figure 3 is a detail view in perspective illustrating particularly the connection of one of the trays of the refrigerating chamber to the ice chamber.
Figure 4:
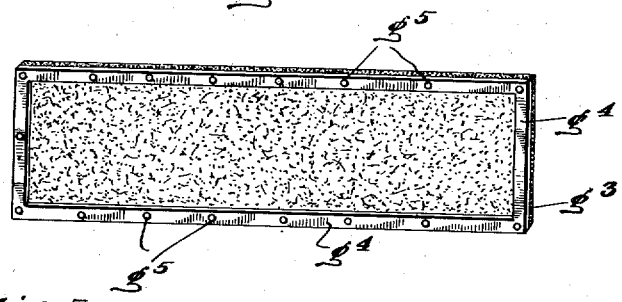
Figure 4 is a detail view in perspective of one of the asbestos sheets which forms the bottom of one of the trays of the refrigerating chamber as seen from below, with its frame.
Figure 5:
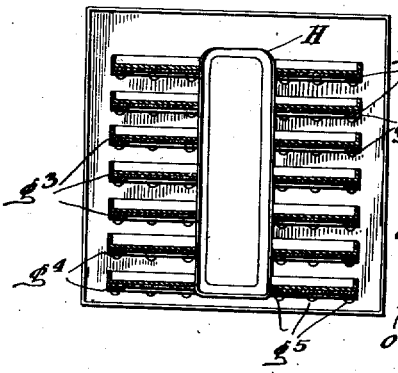
Figure 5 is a detail view illustrating the construction and arrangement of the refrigerating chamber, ice chamber and trays, as seen from the right-hand in Figure 1 with the end wall removed.
Figure 6:
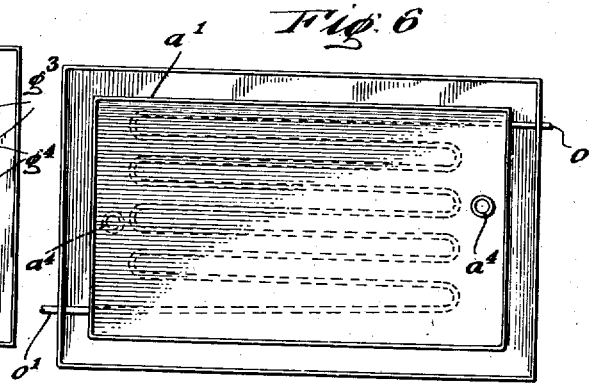
Figure 6 is a detail view illustrating the arrangement of the trays in the absorber.
Figure 7:
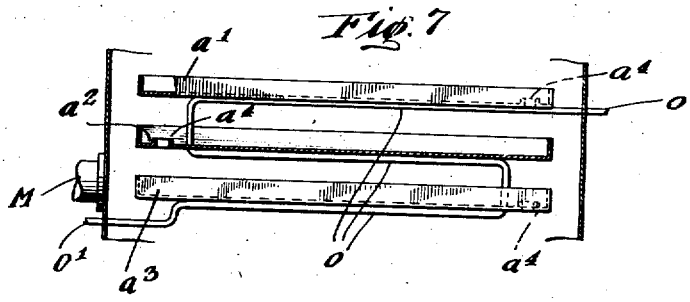
Figure 7 is a fragmentary view showing the application of cooling water pipes to the trays in the absorber.

It being very desirable that evaporation of the cooling agent shall proceed as rapidly as possible in the evaporator, the construction of the evaporator shown in Figures 2, 3, 4 and 5 is preferred. As shown particularly in Figure 2, the evaporator is formed with two wings or parts $G^2$ and $G^3$ which are substantially identical in construction and receive between them the ice chamber H in which ice may be formed if desired. Each part or wing comprises a series of horizontal trays *g* which may be secured by solder or otherwise to the walls of the ice chamber H. Each tray is formed on its upper side with a flange $g^1$ and with a series of relatively large openings $g^2$, which are closed from the underside by a sheet $g^3$ of asbestos or other suitable material, which may be of such texture as will permit the liquid to seep through while at the same time it saturates the sheet secured to the underside of the tray by a light frame $g^4$, which may be secured to the tray in any convenient manner, as by bolts at $g^5$. The cooling agent is delivered by a branch $12^a$ or $12^b$ to the uppermost tray of each series and, through the openings $g^2$, saturates the asbestos sheet from the underside of which evaporation of the cooling agent proceeds rapidly, without the formation of a protecting blanket, the vapor thus disengaged at atmospheric pressure passing down through the pipes M to the absorber, as already explained.

Inasmuch as the trays *g* are secured to and in thermal relation with the walls of the ice chamber H, heat is conducted freely from the ice chamber H to the trays *g* and evaporates the liquid contained therein. On the other hand, inasmuch as the trays are surrounded with the vapors of the auxiliary agent and the evaporated refrigerant, which are poor conductors of heat, the heat from the refrigerating chamber $G^1$ passes through the walls of the evaporator G, and warms the vapors contained therein, but is retarded by the vapors in its passage to the trays *g*, passing to the evaporating liquid at a slower rate per degree temperature difference than the heat from the ice chamber H to the evaporating liquid. The trays *g* therefore are maintained at a relatively low temperature as compared to the outer shell of the evaporator. This facilitates the freezing of the ice in the chamber H.

After cooling the ice chamber H, the refrigerating liquid drops from the lowest tray into the bottom of the shell of the evaporator G and here makes good thermal contact with the refrigerating chamber $G^1$. The auxiliary agent, which is saturated with the vapor of the refrigerant at the temperature of the ice chamber H, passes also downward, and permits vaporization of the refrigerant in the bottom of the evaporator at the relatively high temperature available due to the heat from the chamber $G^1$.

In this way the auxiliary agent is permitted to carry a greater percentage of refrigerant vapor with it to the absorber than if all the evaporation were accomplished at the low temperature required by the ice chamber H. The efficiency of the unit is raised correspondingly as it is clear that the smaller the quantity of auxiliary agent that must be cooled in the evaporator and again heated up in the absorber, the smaller will be the loss sustained. Moreover, additional efficiency is obtained in that the auxiliary agent is not cooled all the way to the temperature of the refrigerating liquid in passing through the evaporator but is kept relatively warm by the heat from the refrigerating chamber $G^1$ with which it makes contact as already described. In this way a smaller quantity of refrigeration is carried away and lost in the absorber.

It is apparent that the two temperature effect will exist whether or not an excess of refrigerating liquid reaches the bottom of the evaporator G, for the refrigerating chamber $G^1$ is cooled by the walls of the evaporator G to an extent which is porportional to the surface of these walls. The secondary or higher temperature evaporation in the bottom of the evaporator G is a means of relieving the design of the evaporator of strict requirements as to the surface of the walls exposed to the refrigerating chamber $G^1$.

During the high temperature evaporation the refrigerating liquid is protected from heat relation with the ice chamber H by the vapors of the auxiliary agent in the same manner as the trays *g* are insulated from the walls of the evaporator G during the low temperature evaporation.

It will be noted that the high temperature just referred to is not due to any appreciable change in the composition of the cooling agent. In a literal sense a small quantity of absorption liquor enters the evaporator G from the condenser C due to the fact that it is impracticable to return to the generator all of the vaporized absorption liquor by means of the rectifier E. There are, therefore, strictly speaking, two elements which form the cooling agent in the evaporator, the one element being the refrigerant which is to be evaporated, and the other being a minute quantity of absorption liquor. This quantity of absorption liquor is normally so small that it does not appreciably change the evaporating temperature of the cooling agent even after much of the cooling agent has been evaporated away, but it has a tendency to collect in the evaporator and if permitted to collect in any substantial quantity would result in a rise of temperature. To prevent this result, in the operation of the present system, the elements in the liquid of the cooling agent are maintained in substantially the same weight proportion as in the vapor of the cooling agent by returning any unevaporated cooling agent in the bottom of the outer shell of the evaporator G to the absorber.

In addition to the function already mentioned such a return of unevaporated cooling agent limits the amount of cooling agent which may be abstracted during operation from the absorber generator system. This has the advantage of preventing the absorption liquor from becoming too weak for proper operation. In this way the quantity of cooling agent as distributed between the generator and the absorber is controlled by the amount present in the evaporator and consequently in accordance with the heat put into the generator. Such return is accomplished as shown herein for purposes of illustration only, by disposing the evaporator above the absorber.

The cooling agent is not only liberated from the absorption liquor in the generator, but the energy realized in the formation of vapor through the application of heat to the absorption liquor is utilized to lift the cooling agent to the condenser and thence to the evaporator, whereby the return to the absorber of unevaporated liquid in the evaporator is effected through the action of gravity.

The absorber is so constructed as to promote absorption by the absorption liquor of the cooling agent at the surface of the liquor. Accordingly it is provided interiorly with a series of horizontal trays $a^1$, $a^2$, $a^3$, each of which is provided as at $a^4$, with an outlet which is raised slightly above the bottom of the tray so as to permit accumulation of the absorption liquor to a moderate depth.

The outlets $a^4$ are staggered so that the liquor flows over the whole surface of the trays, exposing a large surface for absorption of the auxiliary agent within the absorber. As the absorption liquor passes from one tray to the next below it and eventually to the bottom of the absorber vessel the liquor becomes more and more concentrated with subsequent gradation of the vapor pressure of the absorbent until it is in readiness to be returned to the generator while the temperature in the absorber is maintained substantially constant. For the purpose of cooling the absorber and the absorption liquor during the process of absorption and therefore abstracting heat from the system a cooling water pipe $o$, connected to a suitable supply and constituting an ultimate cooling means for the system, is introduced into the absorber at a convenient point, and is soldered to the underside of each tray $a^1$, $a^2$, $a^3$, with many turns, and is eventually led from the absorber A, as at $o^1$, passing through the pre-cooler and discharging as at $o^2$. In this manner the vapor pressure of the absorbent is maintained in conformity with the temperature of the ultimate cooling means and below the pressure of the cooling agent in the gas mixture entering the absorber in a degree appreciably greater than that necessary to effect absorption.

In operation it will be understood that when heat is applied to the generator K the solution is raised from the generator into the separator $K^1$ the ether or other cooling agent being at the same time separated from the absorption liquor, such vapor, being freed as far as possible from the absorption liquor, being then conducted to the condenser C where the vapor is condensed into liquid form and passes on through the evaporator G, such condensed liquid being practically pure ether, or whatever other cooling agent may be employed. The liquid ether is distributed over the trays of the evaporator in the presence of the auxiliary agent, such as air or nitrogen or other suitable agent which is non-condensible at the temperature at which it operates and is inert with respect to the other chemical substances within the apparatus. In the presence of such auxiliary agent the ether or other cooling agent diffuses and evaporates into the auxiliary agent, heat being thereby abstracted from the surroundings while no change in actual or total pressure as between the condenser and the evaporator is necessitated.

In this operation, as necessarily carried out in the apparatus shown in the drawings, the absorption liquor is delivered to the generator K in an amount which exceeds the amount of absorption liquor delivered from the generator to the absorber by and only by the amount of cooling agent which is driven off from the absorption liquor in the generator. This relation is maintained throughout the operation. If the amount of absorption liquor delivered to the generator should exceed the amount of absorption liquor delivered from the generator to the absorber by an amount greater than the amount of cooling agent driven off from the generator it would happen eventually that all of the absorption liquor would pass into the generator and the apparatus would cease to function. On the other hand if the excess of absorption liquor delivered to the generator should be less than the amount of the cooling agent driven off in the generator the absorption liquor would accumulate in the absorber and the system would cease to function. In other words, there is maintained, during the circulation of the absorption liquor between the generator and the absorber, a substantially constant level of absorption liquor in the absorber and a substantially constant level of absorption liquor in the generator.

It will be observed that either nitrogen or air or some functionally equivalent agent may be employed advantageously with ether as the cooling agent. Because such as auxiliary agent and such a cooling agent have specific and molecular weights which differ greatly with the result it is possible to obtain efficient circulation and efficient diffusion.

The ether vapor and auxiliary agent mingle in the evaporator and flow downwardly into the lower part of the absorber A where the gaseous mixture comes in contact with the weak absorption liquor supplied thereto from the separator $K^1$, that is with the liquor in which there is dissolved a relatively less amount of the cooling agent, such liquor being preferably pre-cooled before it enters the absorber.

Through the established relation of the gaseous mixture and the absorption liquor there results an absorption or dissolving of the ether by the absorption liquor and a liberation of the auxiliary agent. Since the auxiliary agent is of markedly different specific weight than the cooling agent and is very much lighter than the cooling agent, it will be seen that the weight per unit volume of gas after it is freed from the ether or other cooling agent in the absorber is less than the weight per unit volume of the gaseous mixture in the evaporator. As a result there will be a constant circulation of fluids between the absorber and the evaporator.

In the operation as thus described the head under which the movement takes place is produced rather by difference in the degree of the mixture than by absolute separation of the elements and subsequent admixture. Some of the ether and other cooling agent passes upward through the pipe M from the absorber along with the auxiliary agent to the evaporator, but the amount of cooling agent thus entrained is small relatively to the proportion of the cooling agent in the mixture within the evaporator.

Absorption liquor, saturated with the cooling agent, is carried from the absorber into the generator K under the influence of the heat applied to the generator. As vapor is formed within the generator it pockets some of the absorption liquor while it is escaping through the conduit 11 and such bodies of liquor will thereby be lifted into the upper part of the separator $K^1$. The liquor thus displaced in the generator K is replaced by additional strong liquor from the absorber, while the weaker liquor, which has been separated in the separator $K^1$ runs by gravity back into the absorber. Because of the fact that the circulation of the absorption liquor between the generator and the absorber is effected through the generation of the cooling agent in the generator, the circulation is more rapid when the process of vapor generation becomes more rapid. In this way more absorption liquor is delivered to the absorber when more cooling agent is generated, condensed, evaporated, and delivered to the absorber. In other words the rate of delivery of the absorbent to the absorber is seen to be controlled in accordance with the amount of cooling agent delivered to the absorber, the economy and effectiveness of which is manifest.

It will be seen that while the actual or total pressure in the apparatus remains at substantially atmospheric pressure, there is a variation as between partial pressures in the evaporator and absorber, the sum of which is equal to the actual or total pressure.

It will further be understood that as the apparatus functions at substantially atmospheric pressure the partial or differential pressures of the cooling agent and the auxiliary agent are respectively below atmospheric pressure and that the lower the pressure of the cooling agent becomes the lower will be the temperature at which it will evaporate, the presence of the auxiliary agent not only permitting operation at constant total pressure, but if present in sufficient volume to exert sufficient partial pressure the cooling agent exerts a partial pressure low enough to permit it to evaporate at freezing temperatures. Thus the auxiliary agent permits operation at a uniform total pressure and operation at substantially atmospheric pressure, such atmospheric pressure being dependent to some extent upon the amount of auxiliary agent present.

It will also be seen that the total pressure within the system is not only brought to that of the atmosphere but is also maintained substantially constant at such atmospheric pressure. This feature is not to be confused with the uniformity of pressure already referred to by which uniformity of pressure as between one part of the system and another is meant.

It is desirable in the practical application of any refrigerating machine to operate throughout a range of evaporating temperatures which temperatures in turn present a range of evaporating pressures during operation. In the present invention operation over this range of evaporating pressures is not permitted to alter appreciably the total pressure within the system itself. This is accomplished by employing an auxiliary agent, the acting or partial pressure of which varies in accordance with the evaporating pressure of the cooling agent to keep the total pressure constant. The variation is effected by the admission or withdrawal of auxiliary agent from or to a reservoir exterior to the system through the vent *a*. In the illustrated embodiment of the invention the reservoir is the atmosphere itself. The vent *a* is purposely placed as shown in the drawings at substantially the point of exit of the auxiliary agent from the absorber, whereby only a negligible amount of cooling agent is permitted to escape from the system by reason of the process described. The feature of keeping the pressure substantially constant within the system is an important one inasmuch as the full advantage of atmospheric pressure operation is not realized unless light materials may be employed for construction and unless leakage of the cooling agent and absorption liquor may still be avoided. Differences of pressure of even a few pounds between the atmosphere and the pressure of the system are therefore to be avoided.

It will be observed that the operation of the system embodies the circulation of the cooling agent from the generator, through the condenser, through the evaporator, through the absorber and back to the generator; a local circulation of the auxiliary agent between the evaporator and the absorber; and a local circulation of the absorption liquor between the generator and the absorber.

I claim as my invention:

1. The process of refrigerating which comprises evaporating a liquid cooling agent of relatively low vapor pressure in the presence of an auxiliary agent inert to the cooling agent, producing a head due to difference in specific weights of a mixture of the vapor of the cooling agent and the auxiliary agent on the one hand and the auxiliary agent on the other hand, forcing the mixture of the vapor of the cooling agent and the auxiliary agent under the influence of the head produced into the presence of an absorption liquor, absorbing the cooling agent in the absorption liquor, withdrawing the absorption liquor from the presence of the auxiliary agent, returning the auxiliary agent into the presence of the cooling agent under the influence of the head produced, heating the absorption liquor and expelling the cooling agent from solution, returning the absorption liquor into the presence of the mixture, condensing the cooling agent, and returning the condensed cooling agent into the presence of the auxiliary agent these several steps of the process taking place in an apparatus open to the pressure of the atmosphere.

2. The process of refrigerating which comprises evaporating a liquid cooling agent of relatively low vapor pressure in the presence of an auxiliary agent inert to the cooling agent and having a specific weight lower than the specific weight of the vapor of the cooling agent, producing a head due to difference in specific weights, forcing the mixture of the vapor of the cooling agent and auxiliary agent under the influence of tne head produced into the presence of an absorption liquor, segregating the cooling agent from the auxiliary agent by absorption, and returning the auxiliary agent into the presence of the cooling agent under the influence of the head produced these several steps of the process taking place in an apparatus open to the presssure of the atmosphere.

3. The improvement in the process of refrigerating by the aid of a system including an evaporator and an absorber and open to the influence of atmospheric pressure which consists in diffusing a cooling agent which is in itself of relatively low vapor pressure, without admixture of an absorbent in the presence of an auxiliary agent in the evaporator, and circulating the auxiliary agent through the evaporator and the absorber.

4. The improvement in the process of refrigerating by the aid of a system including an evaporator and an absorber and open to the influence of atmospheric pressure which consists in diffusing a cooling agent of relatively low vapor pressure in the presence of an auxiliary agent in the evaporator, and circulating the auxiliary agent through the evaporator and the absorber exclusively by difference in specific weights of vertically extending bodies of fluid in the system.

5. The process of refrigerating which comprises evaporating a liquid cooling agent in the presence of an auxiliary agent at a relatively low temperature, facilitating through avoidance of inter-position of non-conductive matter, the heat transfer between the evaporating liquid and one portion of the space refrigerated, retarding through interposition of non-conductive matter the heat transfer between the evaporating liquid and a second portion of the space refrigerated, continuing the evaporation of the cooling agent in the presence of the auxiliary agent at another point and at a higher temperature, facilitating heat transfer between the evaporating liquid and the second mentioned portion of the space refrigerated, retarding heat transfer between the evaporating liquid and the first mentioned portion of the space refrigerated, introducing the mixed vapors of the cooling agent and the auxiliary agent into the presence of an absorption liquor and absorbing the cooling agent therein, withdrawing the absorption liquor with the cooling agent in solution therein from the presence of the auxiliary agent, returning the auxiliary agent into the presence of the liquid cooling agent, heating the absorption liquor with the cooling agent in solution and expelling the cooling agent from solution, returning the absorption liquor into the presence of the auxiliary agent and vaporized cooling agent, condensing the cooling agent, and returning the condensed cooling agent into the presence of the auxiliary agent.

6. The process of refrigerating which comprises evaporating a liquid cooling agent in the presence of an auxiliary agent at a relatively low temperature and at substantially atmospheric pressure, facilitating through avoidance of inter-position of non-conductive matter the heat transfer between the evaporating liquid and one portion of the space refrigerated, retarding through interposition of non-conductive matter the heat transfer between the evaporating liquid and a second portion of the space refrigerated, continuing the evaporation of the cooling agent in the presence of the auxiliary agent at another point and at a higher temperature, facilitating heat transfer between the evaporating liquid and the second mentioned portion of the space refrigerated, retarding heat transfer between the evaporating liquid and the first mentioned portion of the space refrigerated, introducing the mixed vapors of the cooling agent and the auxiliary agent into the presence of an absorption liquor and absorbing the cooling agent therein, withdrawing the absorption liquor with the cooling agent in solution therein from the presence of the auxiliary agent, returning the auxiliary agent into the presence of the liquid cooling agent, heating the absorption liquor with the cooling agent in solution and expelling the cooling agent from solution, returning the absorption liquor into the presence of the auxiliary agent and vaporized cooling agent, condensing the cooling agent, and returning the condensed cooling agent into the presence of the auxiliary agent.

7. The process of refrigerating which comprises evaporating a liquid cooling agent in the presence of an auxiliary agent, transferring heat to the cooling agent from one portion of the space refrigerated, interposing the mixture of the vapor of the cooling agent and the auxiliary agent between the evaporating liquid and said portion of the space refrigerated, transferring heat to the cooling agent from a second portion of the space refrigerated without interposing the mixture of the vapors of the cooling agent and the auxiliary agent, introducing the mixed vapors of the cooling agent and the auxiliary agent into the presence of an absorption liquor and absorbing the cooling agent therein, withdrawing the absorption liquor with the cooling agent in solution therein from the presence of the auxiliary agent, returning the auxiliary agent into the presence of the liquid cooling agent, heating the absorption liquor with the cooling agent in solution and expelling the cooling agent from solution, returning the absorption liquor into the presence of the auxiliary agent and vaporized cooling agent, condensing the cooling agent, and returning the condensed cooling agent into the presence of the auxiliary agent.

8. The process of refrigerating which comprises evaporating a liquid cooling agent substantially at atmospheric pressure in the presence of an auxiliary agent, transferring heat to the cooling agent from one portion of the space refrigerated, interposing the mixture of the vapor of the cooling agent and the auxiliary agent between the evaporating liquid and said portion of the space refrigerated, transferring heat to the cooling agent from a second portion of the space refrigerated without interposing the mixture of the vapors of the cooling agent and the auxiliary agent, introducing the mixed vapors of the cooling agent and the auxiliary agent into the presence of an absorption liquor and absorbing the cooling agent therein, withdrawing the absorption liquor with the cooling agent in solution therein from the presence of the auxiliary agent, returning the auxiliary agent into the presence of the liquid cooling agent, heating the absorption liquor with the cooling agent in solution and expelling the cooling agent from solution, returning the absorption liquor into the presence of the auxiliary agent and vaporized cooling agent, condensing the cooling agent, and returning the condensed cooling agent into the presence of the auxiliary agent.

9. The improvement in the process of refrigerating by the aid of a system including an evaporator and an absorber to receive an absorbent and open to the influence of atmospheric pressure, which consists in diffusing a liquid cooling agent of relatively low vapor pressure in the presence of an auxiliary agent, maintaining the elements of the liquid cooling agent in substantially the same weight proportion as in the vapor of the cooling agent, delivering the mixture of the vapor of the cooling agent and the auxiliary agent to the absorber, cooling the absorbent and thereby lowering the vapor pressure of the absorbent, absorbing the vapors of the cooling agent and returning the auxiliary agent into the presence of the liquid cooling agent.

10. The improvement in the process of refrigerating by the aid of a system including an evaporator and an absorber to receive an absorbent and open to the influence of atmospheric pressure, which consists in diffusing a liquid cooling agent of relatively low vapor pressure in the presence of an auxiliary agent, maintaining the elements of the liquid cooling agent in substantially the same weight proportion as in the vapor of the cooling agent, delivering the mixture of the vapor of the cooling agent and the auxiliary agent to the absorber, cooling the absorbent and thereby lowering the vapor pressure of the absorbent to conform with the temperature of the ultimate cooling means, absorbing the vapors of the cooling agent, and returning the auxiliary agent into the presence of the liquid cooling agent.

11. The improvement in the process of refrigerating by the aid of a system including an evaporator and an absorber to receive an absorbent and open to the influence of atmospheric pressure, which consists in diffusing a liquid cooling agent of relatively low vapor pressure in the presence of an auxiliary agent, maintaining the elements of the liquid cooling agent in substantially the same weight proportion as in the vapor of the cooling agent, delivering the mixture of the vapor of the cooling agent and the auxiliary agent to the absorber, cooling the absorbent and thereby lowering the vapor pressure of the absorbent, maintaining the vapor pressure of the absorbent in conformity with the temperature of the ultimate cooling means, absorbing the vapors of the cooling agent, and returning the auxiliary agent into the presence of the liquid cooling agent.

12. The improvement in the process of refrigerating by the aid of a system including an evaporator and an absorber to receive an absorbent and open to the influence of atmospheric pressure, which consists in diffusing a liquid cooling agent of relatively low vapor pressure in the presence of an auxiliary agent, maintaining the elements of the liquid cooling agent in substantially the same weight proportion as in the vapor of the cooling agent, delivering the mixture of the vapor of the cooling agent and the auxiliary agent to the absorber, cooling the absorbent and thereby lowering the vapor pressure of the absorbent, maintaining the vapor pressure of the absorbent below the pressure of the cooling agent in the gas mixture entering the absorber, absorbing the vapors of the cooling agent, and returning the auxiliary agent into the presence of the liquid cooling agent.

13. The improvement in the process of refrigerating by the aid of a system including an evaporator and an absorber to receive an absorbent and open to the influence of atmospheric pressure, which consists in diffusing a liquid cooling agent of relatively low vapor pressure in the presence of an auxiliary agent, maintaining the elements of the liquid cooling agent in substantially the same weight proportion as in the vapor of the cooling agent, delivering the mixture of the vapor of the cooling agent and the auxiliary agent to the absorber, cooling the absorbent and thereby lowering the vapor pressure of the absorbent, maintaining the vapor pressure of the absorbent below the pressure of the cooling agent in the gas mixture entering the absorber in a degree appreciably greater than that necessary to effect absorption, absorbing the vapors of the cooling agent, and returning the auxiliary agent into the presence of the liquid cooling agent.

14. The improvement in the process of refrigerating by the aid of a system including an evaporator and an absorber to receive an absorbent and open to the influence of atmospheric pressure, which consists in diffusing a liquid cooling agent of relatively low vapor pressure in the presence of an auxiliary agent, maintaining the elements of the liquid cooling agent in substantially the same weight proportion as in the vapor of the cooling agent, delivering the mixture of the vapor of the cooling agent and the auxiliary agent to the absorber, cooling the absorbent and thereby lowering the vapor pressure of the absorbent, absorbing the vapors of the cooling agent in the absorbent, withdrawing the absorbent from the presence of the auxiliary agent, heating the absorbent and expelling the cooling agent from the solution, and returning the absorbent into the presence of the mixture.

15. The improvement in the process of refrigerating by the aid of a system including an evaporator and an absorber to receive an absorbent and open to the influence of atmospheric pressure, which consists in diffusing a liquid cooling agent of relatively low vapor pressure in the presence of an auxiliary agent, maintaining the elements of the liquid cooling agent in substantially the same weight proportion as in the vapor of the cooling agent, delivering the mixture of the vapor of the cooling agent and the auxiliary agent to the absorber, absorbing the vapors of the cooling agent in the absorbent, withdrawing the absorbent from the presence of the auxiliary agent, heating the absorbent and expelling the cooling agent from the solution, condensing the cooling agent, and returning the condensed cooling agent into the presence of the auxiliary agent.

16. The improvement in the process of refrigerating by the aid of a system including an evaporator, an absorber to receive an absorbent, and a generator and open to the influence of atmospheric presence, which consists in diffusing a liquid cooling agent of relatively low vapor pressure in the presence of an auxiliary agent, maintaining the elements of the liquid cooling agent in substantially the same weight proportion as in the vapor of the cooling agent, delivering the mixture of the vapor of the cooling agent and the auxiliary agent to the absorber, cooling the absorbent and thereby lowering the vapor pressure of the absorbent, delivering the absorbent to the generator in an amount exceeding the amount of the absorbent delivered from the generator to the absorber only by the amount of the cooling agent driven off in the generator, absorbing the vapors of the cooling agent, and returning the auxiliary agent into the presence of the liquid cooling agent.

17. The improvement in the process of refrigerating by the aid of a system including an evaporator, an absorber to receive an absorbent, and a generator and open to the influence of atmospheric pressure, which consists in diffusing a liquid cooling agent of relatively low vapor pressure in the presence of an auxiliary agent, maintaining the elements of the liquid cooling agent in substantially the same weight proportion as in the vapor of the cooling agent, delivering the mixture of the vapor of the cooling agent and the auxiliary agent to the absorber, cooling the absorbent and thereby lowering the vapor pressure of the absorbent to conform with the temperature of the ultimate cooling means, delivering the absorbent to the generator in an amount exceeding the amount of the absorbent delivered from the generator to the absorber only by the amount of the cooling agent driven off in the generator, absorbing the vapors of the cooling agent, and returning the auxiliary agent into the presence of the liquid cooling agent.

18. The improvement in the process of refrigerating by the aid of a system including an evaporator, an absorber to receive an absorbent, and a generator and open to the influence of atmospheric pressure, which consists in diffusing a liquid cooling agent of relatively low vapor pressure in the presence of an auxiliary agent, maintaining the elements of the liquid cooling agent in substantially the same weight proportion as in the vapor of the cooling agent, delivering the mixture of the vapor of the cooling agent and the auxiliary agent to the absorber, cooling the absorbent and thereby lowering the vapor pressure of the absorbent, delivering the absorbent to the generator in an amount exceeding the amount of the absorbent delivered from the generator to the absorber only by the amount of cooling agent driven off in the generator, absorbing the vapors of the cooling agent, maintaining, during circulation of the absorbent between the generator and the absorber, a substantially constant level of absorbent in the absorber and a substantially constant level of absorbent in the generator, and returning the auxiliary agent into the presence of the liquid cooling agent.

19. The improvement in the process of refrigerating by the aid of a system including an evaporator and an absorber to receive an absorbent and open to the influence of atmospheric pressure, which consists in delivering a gas mixture of the vapor of a cooling agent and an auxiliary agent to the absorber, cooling the absorbent and thereby lowering the vapor pressure of the absorbent to conform with the temperature of the ultimate cooling means, absorbing the vapors of the cooling agent, delivering the auxiliary agent to the evaporator, evaporating a cooling agent of relatively low vapor pressure in the presence of the auxiliary agent, and maintaining the elements of the liquid cooling agent in substantially the same weight proportion as in the vapor of the cooling agent.

20. The improvement in the process of refrigerating by the aid of a system including an evaporator and an absorber to receive an absorbent and open to the influence of atmospheric pressure, which consists in delivering a gas mixture of the vapors of the cooling agent and an auxiliary agent to the absorber, lowering the vapor pressure of the absorbent below the pressure of the cooling agent of the gas mixture in the absorber in a degree appreciably greater than that necessary to effect absorption, absorbing the vapors of the cooling agent, delivering the auxiliary agent to the evaporator, evaporating the cooling agent of relatively low vapor pressure in the presence of the auxiliary agent, and maintaining the elements of the liquid cooling agent in substantially the same weight proportion as in the vapor of the cooling agent.

21. The improvement in the process of refrigerating by the aid of a system including an evaporator and an absorber to receive an absorbent and open to the influence of atmospheric pressure, which consists in delivering a gas mixture of the vapors of the cooling agent and an auxiliary agent to the absorber, maintaining a gradation in the vapor pressure of the absorbent and at a substantially constant temperature throughout the absorber, absorbing the vapors of the cooling agent, delivering the auxiliary agent to the evaporator, evaporating the cooling agent of relatively low vapor pressure in the presence of the auxiliary agent, and maintaining the elements of the liquid cooling agent in substantially the same weight proportion as in the vapor of the cooling agent.

22. The improvement in the process of refrigerating by the aid of a system including an evaporator, an absorber to receive an absorbent and a generator and open to the influence of atmospheric pressure, which consists in evaporating a liquid cooling agent of relatively low vapor pressure in the presence of an auxiliary agent, maintaining the elements of the liquid cooling agent in substantially the same weight proportion as in the vapor of the cooling agent, delivering the mixture of the vapor of the cooling agent and the auxiliary agent to the absorber, cooling the absorbent and thereby lowering the vapor pressure of the absorbent to conform with the temperature of the ultimate cooling means, absorbing the vapors of the cooling agent, returning the auxiliary agent into the presence of the liquid cooling agent, heating the absorbent and expelling the cooling agent therefrom, and maintaining during the operation a substantially constant quantity of cooling agent within the system.

23. The improvement in the process of refrigerating by the aid of a system including an evaporator, an absorber to receive an absorbent, and a generator and open to the influence of atmospheric pressure, which consists in evaporating a liquid cooling agent of relatively low vapor pressure in the presence of an auxiliary agent, maintaining the elements of the liquid cooling agent in substantially the same weight proportion as in the vapor of the cooling agent, delivering the mixture of the vapor of the cooling agent and the auxiliary agent to the absorber, absorbing the vapors of the cooling agent, returning the auxiliary agent into the presence of the liquid cooling agent, withdrawing the absorbent from the presence of the auxiliary agent, heating the absorbent and expelling the cooling agent therefrom, returning the absorbent with the cooling agent expelled therefrom into the presence of the auxiliary agent, and maintaining during the operation a quantity of cooling agent in the absorbent as distributed between the absorber and the generator varying only in amount by the quantity of cooling agent present in the evaporator.

24. The improvement in the process of refrigerating by the aid of a system including an evaporator, an absorber to receive an absorbent, and a generator and open to the influence of atmospheric pressure, which consists in evaporating a liquid cooling agent of relatively low vapor pressure in the presence of an auxiliary agent, maintaining the elements of the liquid cooling agent in substantially the same weight proportion as in the vapor of the cooling agent, delivering the mixture of the vapor of the cooling agent and the auxiliary agent to the absorber, absorbing the vapors of the cooling agent, returning the auxiliary agent into the presence of the liquid cooling agent, withdrawing the absorbent from the presence of the auxiliary agent, heating the absorbent and expelling the cooling agent therefrom, returning the absorbent with the cooling agent expelled therefrom into the presence of the auxiliary agent, and controlling the quantity of cooling agent in the absorbent as distributed between the generator and absorber in accordance with the heat put into the generator.

25. The improvement in the process of refrigerating by the aid of a system including an evaporator, an absorber to receive an absorbent and a generator and open to the influence of atmospheric pressure, which consists in evaporating a liquid cooling agent of relatively low vapor pressure in the presence of an auxiliary agent, maintaining the elements of the liquid cooling agent in substantially the same weight proportion as in the vapor of the cooling agent, delivering the mixture of the vapor of the cooling agent and the auxiliary agent to the absorber, absorbing the vapors of the cooling agent, returning the auxiliary agent into the presence of the liquid cooling agent, withdrawing the absorbent from the presence of the auxiliary agent, heating the absorbent and expelling the cooling agent therefrom, returning the absorbent with the cooling agent expelled therefrom into the presence of the auxiliary agent, and limiting during the operation the quantity of cooling agent which may be removed from the absorbent as distributed between the generator and the absorber.

26. The improvement in the process of refrigerating by the aid of a system including an evaporator and an absorber to receive an absorbent and open to the influence of atmospheric pressure, which consists in evaporating a liquid cooling agent of relatively low vapor pressure in the presence of an auxiliary agent, maintaining the elements of the liquid cooling agent in substantially the same weight proportion as in the vapor of the cooling agent, delivering the mixture of the vapor of the cooling agent and the auxiliary agent to the absorber, absorbing the vapors of the cooling agent, returning the auxiliary agent into the presence of the liquid cooling agent, and controlling the rate of circulation of the auxiliary agent between the evaporator and the absorber in accordance with the refrigerating effect required.

27. The improvement in the process of refrigerating by the aid of a system including an evaporator and an absorber to receive an absorbent, which consists in evaporating a liquid cooling agent in the presence of an auxiliary agent, maintaining during the operation the elements in the liquid of the cooling agent in substantially the same weight proportion as in the vapor of the cooling agent, delivering the evaporated cooling agent and the auxiliary agent to an absorber, absorbing the vapors of the evaporated cooling agent in the absorbent and thereby producing further evaporation in the evaporator, returning the auxiliary agent into the presence of the unevaporated cooling agent, and maintaining within the system during the operation a pressure which is substantially the same at all times.

28. The improvement in the process of refrigerating by the aid of a system including an evaporator and an absorber to receive an absorbent, which consists in evaporating a liquid cooling agent, maintaining during the operation the elements in the liquid of the cooling agent substantially in the same weight proportion as in the vapor of the cooling agent, delivering the evaporated cooling agent to an absorber, cooling the absorber and thereby lowering the vapor pressure of the absorbent to conform with the temperature of ultimate cooling means, absorbing the cooling agent, and maintaining within the system during the operation a pressure which is substantially the same at all times.

29. The improvement in the process of refrigerating by the aid of a system including an evaporator and an absorber to receive an absorbent, which consists in evaporating a cooling agent in the presence of an auxiliary agent, maintaining during the operation the elements in the liquid of the cooling agent in substantially the same weight proportion as in the vapor of the cooling agent, delivering the evaporated cooling agent and the auxiliary agent to an absorber, absorbing the vapors of the cooling agent, returning the auxiliary agent into the presence of the unevaporated cooling agent, and maintaining within the system during the operation a pressure which is substantially the same at all times.

30. The improvement in the process of refrigerating by the aid of a system including an evaporator and an absorber to receive an absorbent, which consists in absorbing the vapor of a cooling agent from admixture with an auxiliary agent, controlling the rate of delivery of the absorbent to the absorber in accordance with the quantity of the cooling agent delivered to the absorber, delivering the auxiliary agent to an evaporator, evaporating in the evaporator a liquid cooling agent of relatively low vapor pressure in the presence of the auxiliary agent, and maintaining during the operation the elements in the liquid of the cooling agent in substantially the same weight proportion as in the vapor of the cooling agent.

31. The improvement in the process of refrigerating by the aid of a system including an evaporator, a space to be refrigerated, and an absorber to receive an absorbent and open to the influence of atmospheric pressure, which consists in evaporating a liquid cooling agent in the presence of an auxiliary agent, maintaining the elements in the liquid of the cooling agent in substantially the same weight proportion as in the vapor cooling agent, passing the mixed vapors of the cooling agent and the auxiliary agent through the space to be refrigerated and thereby removing heat from a heat emanating source within the space, delivering the mixed vapors to the absorber, cooling the absorbent and thereby maintaining the vapor pressure of the absorbent in conformity with the ultimate cooling means, absorbing the vapors of the cooling agent and thereby producing further evaporation in the evaporator, returning the auxiliary agent to the evaporator, and maintaining within the system during the operation a pressure which is substantially the same at all times.

This specification signed this 15th day of April, A. D. 1931.

DONALD B. KNIGHT.